Figure 1:
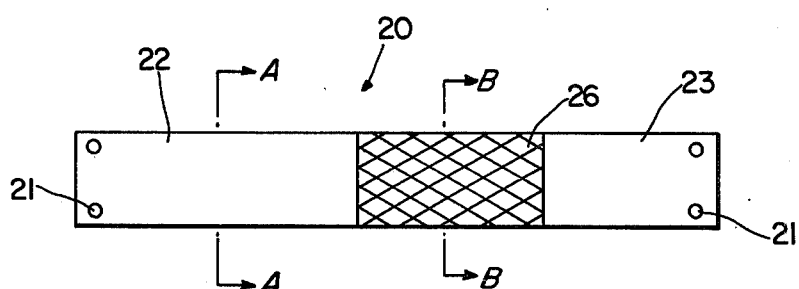

United States Patent [19]

Sanders et al.

[11] 4,455,123
[45] Jun. 19, 1984

[54] CONNECTING ELEMENT AND HELICOPTER ROTOR INCORPORATING SAME

[75] Inventors: Roy Sanders, Langport; Michael J. Redstone, Malton, both of England

[73] Assignee: Westland plc, Yeovil, England

[21] Appl. No.: 384,045

[22] Filed: Jun. 1, 1982

[51] Int. Cl.³ ............................................. B64C 27/38
[52] U.S. Cl. .................... 416/134 A; 416/138
[58] Field of Search ................ 416/134 A, 138 A, 141

[56] References Cited

U.S. PATENT DOCUMENTS

| | | | |
|---|---|---|---|
| 3,669,566 | 6/1972 | Bourquardez et al. | 416/134 A |
| 3,692,361 | 9/1972 | Ivarsson | 297/385 |
| 3,762,834 | 10/1973 | Bourquardez et al. | 416/134 A |
| 3,765,267 | 10/1973 | Bourquardez et al. | 74/581 |
| 4,038,885 | 8/1977 | Jonda | 74/581 |
| 4,183,261 | 1/1980 | Eiselbrecher et al. | 74/579 R |
| 4,227,859 | 10/1980 | Gouzien et al. | 416/134 A |
| 4,255,087 | 3/1981 | Wackerle et al. | 416/230 |

Primary Examiner—Everette A. Powell, Jr.
Attorney, Agent, or Firm—Larson & Taylor

[57] ABSTRACT

A connecting element having end regions (22, 23) joined by an intermediate by an intermediate region (26) is constructed of a plurality of fibre filaments extending longitudinally and continuously throughout its length. The fibers in the end regions are embedded in a thermosetting resin matrix material and the fibres in the intermediate region are embedded in a resilient matrix material thereby permitting relative resilient torsional movement of the end regions about a longitudinal axis. Such a connecting element is particularly suited for use in a helicopter rotor and several embodiments are described and illustrated. In all embodiments the torsional flexibility of intermediate region (26) provides for blade feathering movements and in a preferred embodiment the inner end region (22) is constructed so as to be resiliently flexible in a blade flap plane and the outer end region (23) is constructed so as to be equally resiliently flexible in the blade flap and lead/lag planes.

16 Claims, 7 Drawing Figures

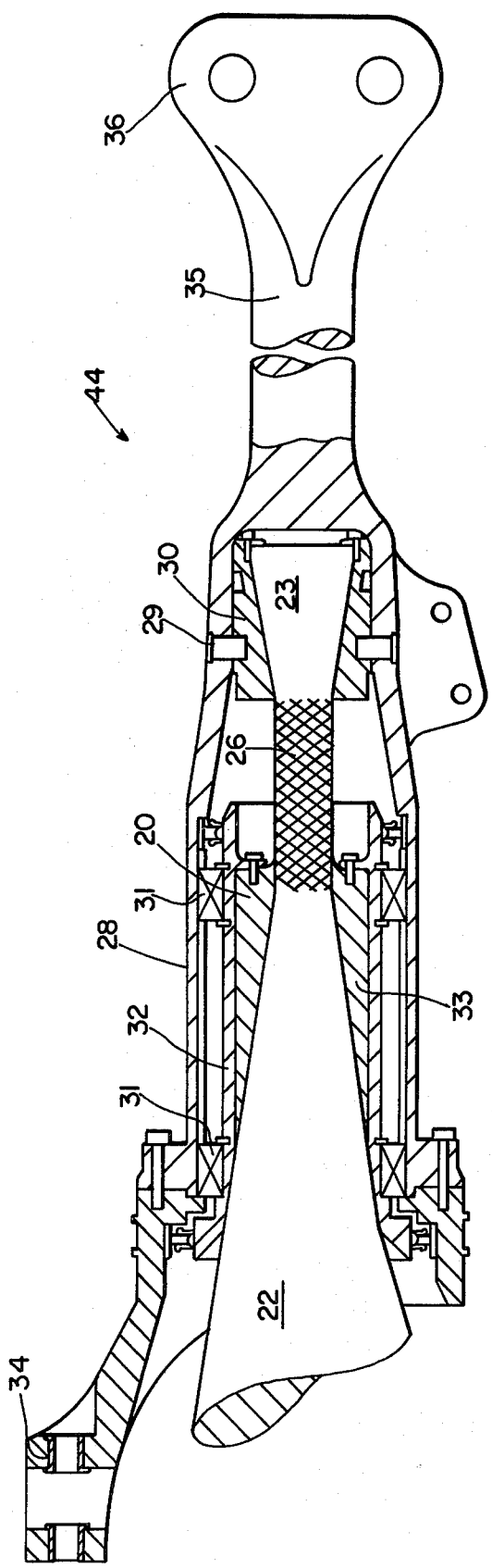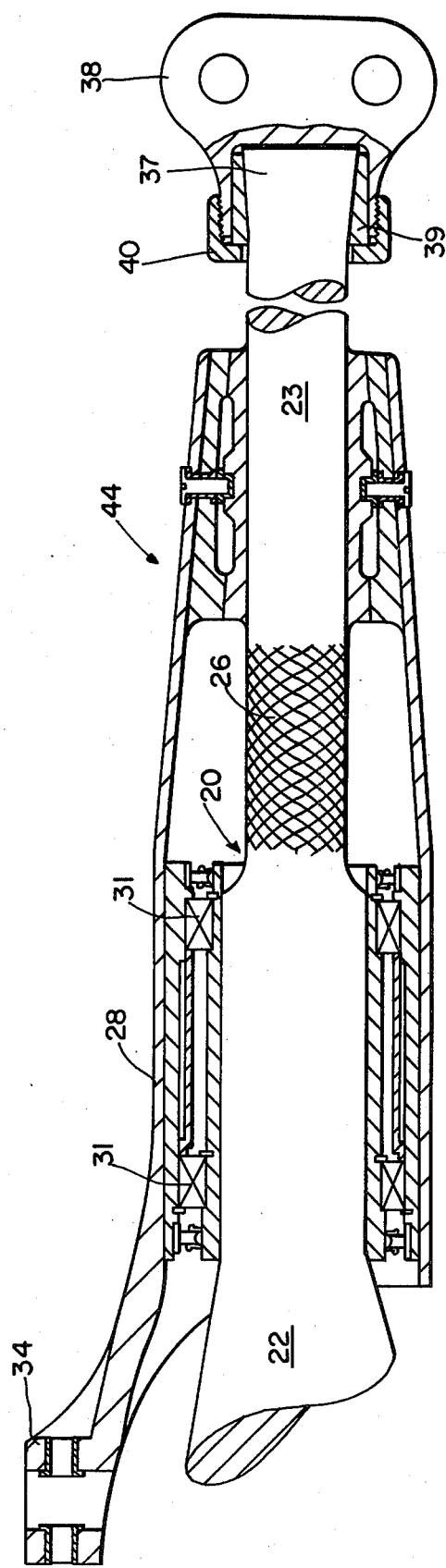

CONNECTING ELEMENT AND HELICOPTER ROTOR INCORPORATING SAME

DESCRIPTION OF INVENTION

This invention relates to connecting elements and is particularly concerned with fibre-reinforced plastics connecting elements for connecting a helicopter rotor blade to a rotor hub, and with a helicopter rotor incorporating such an element.

A significant development in helicopter engineering has been the semi-rigid rotor in which each of a plurality of main sustaining rotor blades is attached to a rotor head by connecting elements arranged to be resiliently flexible around at least one axis to provide for either blade flap, blade lag or blade feathering movements.

No. GB-A-1310035 discloses a semi-rigid rotor in which each rotor blade is attached to a rotor hub through inner and outer flexure members connected centrally through a feathering hinge. The inner flexure member is designed to be flexible in a blade flap plane so as to provide for the major portion of blade flap movements, and the outer flexure member is arranged to be equally flexible in the blade flap and lag planes so as to provide for blade lag movements and to minimise undesirable pitch/flap coupling effects.

This rotor exhibits high control power resulting in increased manoeuvrability of a helicopter on which it is fitted, is very reliable and has significantly reduced maintenance procedures as compared to prior fully articulated rotor systems. However, in order to transmit centrifugal loads through the feathering hinge, this rotor utilises a torsionally flexible, inextensible tie bar within the hinge which increases the diameter of the hinge and therefore its frontal area, complicates manufacture and increases weight.

No. GB-A-1313181 discloses a bearingless helicopter rotor including a plurality of pre-cured fibre-reinforced plastics rods each consisting of a plurality of fibre filaments and intended to provide resilient flexibility in perpendicularly opposed planes to permit blade flap and lag movements, and in torsion to provide blade feathering movements. However, the stiffness of the blade flap, lag and feathering movement requirements of a helicopter rotor vary considerably, so that it may be difficult to achieve the desired properties in the single element of this disclosure.

Accordingly, in one aspect, this invention provides an elongate connecting element having end regions joined together by an intermediate region and comprising a plurality of fibre filaments extending substantially longitudinally and continuously throughout its length, that portion of the length of fibre filaments extending through the end regions being embedded in a thermo-setting resin matrix material and that portion of the length of the fibre filaments extending through the intermediate region being embedded in a resilient matrix material thereby to permit relative resilient torsional movement of the end regions about the longitudinal axis of the element.

By a fibre filament we mean a single fibre as drawn or spun. Such filaments are available in the form of rovings which consist of a parallel group of filaments and which aids handling and lay-up procedures.

The resilient matrix material may be an elastomer material.

Preferably, the fibre filaments are unidirectional fibre filaments and may comprise glass fibre filaments.

At least one of the end regions may be constructed so as to be resiliently flexible in one of two perpendicularly opposed planes containing the longitudinal axis and, in one of two perpendicularly opposed planes containing the longitudinal axis and the other end region is equally resiliently flexible in both of said planes.

In such an embodiment, the end region resiliently flexible in one plane may have a flattened cross-sectional shape and the end region resiliently flexible in both planes may have a circular cross-sectional shape.

In another aspect, the invention provides a helicopter rotor having a rotor hub and a plurality of radially extending rotor blades and including for each blade, an elongate connecting element constructed of a plurality of fibre filaments extending longitudinally and substantially continuously throughout its length and including inner and outer end regions wherein said filaments are embedded in a resin matrix material and an intermediate region wherein said filaments are embedded in a resilient matrix material, said inner end region extending from the rotor hub and adapted to be resiliently flexible in a blade flap plane, and blade pitch change means rotationally fixed to the outer end region and adapted during operation to twist the outer end region relative the inner end region to effect blade pitch changes.

The fibre filaments in the intermediate region may be embedded in an elastomer matrix material.

The pitch change means may comprise a torque tube extending inwardly from its attachment to said outer end region of the connecting element to encompass the intermediate region and at least part of the inner end region of the element. Preferably, the torque tube is rotationally supported on the inner end region by axially spaced-apart bearings.

In a preferred embodiment, the outer end region extends radially outwardly to an outer end adapted for the attachment of a rotor blade and is equally resiliently flexible in both the blade flap and lag planes.

In yet another aspect the invention provides a helicopter rotor including a rotor hub and a plurality of radially extending rotor blade connecting elements, each element comprising an inner end region attached to the rotor hub, an intermediate region and an outer end region and is constructed of a plurality of fibre filaments extending substantially longitudinally and continuously throughout its length, that portion of the fibre filaments extending through the end regions being embedded in a thermo-setting resin matrix material and that portion of the length of the fibre filaments extending through the intermediate region being embedded in a resilient matrix material, the inner end region having a generally flattened configuration in a plane co-incident with the plane of rotation of the rotor so as to be resiliently flexible in a blade flap plane, and an inwardly extending torque tube rotationally fixed to the outer end region and adapted for connection to a rotor control system whereby blade feathering movements are permitted by resilient torsional motion of the intermediate region.

Figure 2:
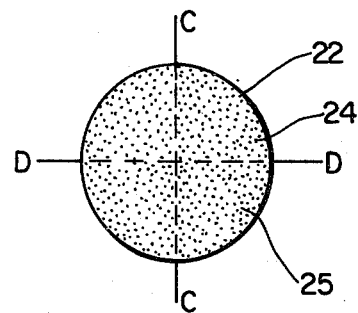
Figure 3:
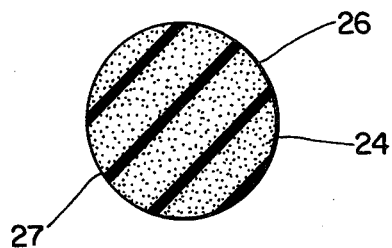
Figure 6:
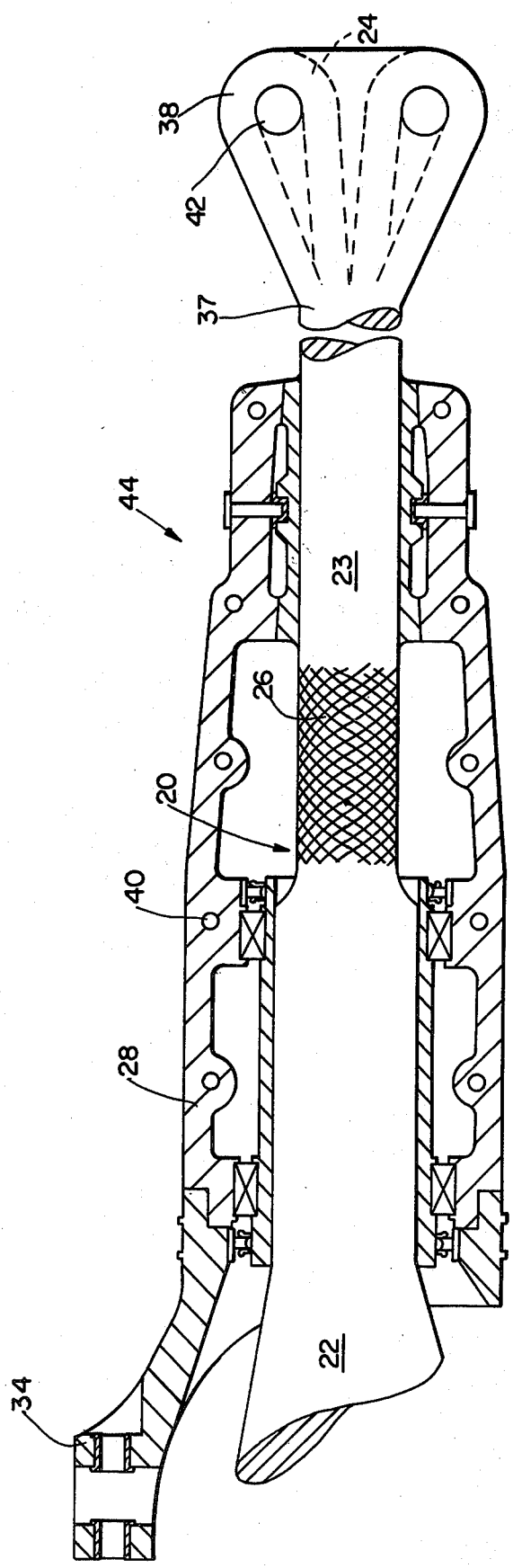
Figure 7:
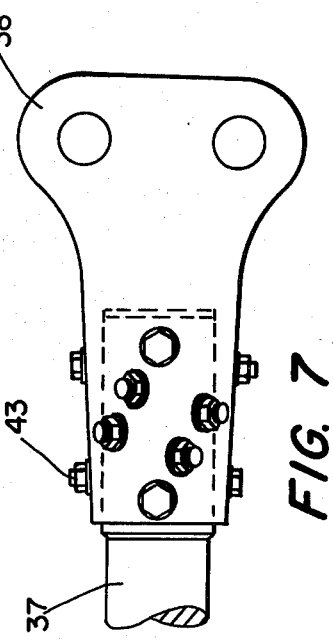

The invention will now be described by way of example only and with reference to the accompanying drawings, in which, FIG. 1 is a side elevation of an elongate connecting member constructed in accordance with one embodiment of the invention, FIG. 2 is a cross-sectional view of the element of FIG. 1 taken along lines A—A, FIG. 3 is a cross-sectional view of the element of FIg. 1 taken along lines B—B, FIG. 4 is a fragmentary plan view of a helicopter rotor incorporating an elongate connecting element and constructed in accordance with another embodiment, FIG. 5 is a fragmentary plan view of a helicopter rotor incorporating an elongate connecting element and constructed in accordance with a yet further embodiment, FIG. 6 is a fragmentary plan view of a helicopter rotor incorporating an elongate connecting element and constructed in accordance with a yet further embodiment and, FIG. 7 is a fragmentary plan view of detailed features of a modification for use with the embodiment of FIG. 5.

Referring now to FIGS. 1 to 3 inclusive, an elongate connecting element 20 includes end regions 22 and 23 joined together by intermediate region 26 and is constructed of a plurality of unidirectional glass fibre filaments 24 extending longitudinally and continuously throughout its length. In the illustrated embodiment, both ends of element 20 are provided with apertures 21 to facilitate attachment between items which, in operation, the element is intended to join together.

In the end regions 22 and 23 the fibre filaments 24 are embedded in a thermo-setting epoxy resin 25 (FIG. 2), and either or both end regions may be constructed so as to exhibit resiliently flexible properties in one or both of two perpendicularly opposed planes C—C or D—D (FIG. 2) both containing a longitudinal axis of the element. In the intermediate region 26 (FIG. 3), the fibre filaments 24 are embedded in a resilient matrix 27 of elastomer which provides torsional flexibility so as to permit relative twisting of end regions 22 and 23 about the longitudinal axis of the element and with resilient return.

The following process has been used successfully to manufacture a connecting element as described above and having a diameter of 6.0 centimeters, a length of 1.22 meters and incorporating a centralised intermediate region 26 (FIG. 1) having a length of 15.24 centimeters. The materials used were Silenka unidirectional glass fibre rovings in tow form, Ciba Geigy 4029 resin and Monothane A40 elastomer.

A sheet of plastics material approximately 17.8 centimeters wide is laid on an upper surface of a hot plate which includes identification markings defining the intended longitudinal boundaries of the intermediate region 26. The hot plate is retained at a temperature of about 90° C.

The elastomer is heated and applied in its molten state to the sheet of plastics material between the longitudinal boundaries of the intended intermediate region 26.

Twenty two individual rovings each comprising a plurality of glass fibre filaments are then stretched side-by-side and parallel to the surface of the hot plate and spaced above the coated plastics sheet to form a ribbon approximately 10.2 centimeters wide. The ribbon is then lowered on to the surface of the sheet on the hot plate and the elastomer area is wetted out. Surplus elastomer is scraped from the ribbon.

A minimum necessary amount of resin is then applied throughout the extent of the end regions 22 and 23 (FIG. 1) to abut the extremity of the elastomer wetted intermediate region 26, and the end regions 22 and 23 are wetted out with the resin.

The ribbon is then removed from the hot plate and it will be understood that the plastics sheet aids handling and storage of the ribbons. Sixty ribbons are prepared in the manner described above and, if storage is required, two ribbons are arranged face to face between their respective plastics sheets and placed in airtight packs for storage in a refrigerator.

When it is desired to commence laying up the component, the ribbons are removed from the refrigerator and allowed to reach room temperature before the airtight seal is broken.

A two part mould is used in the lay-up process, each half having a longitudinally extending semicircular cut-out. A release agent is applied to the surfaces of each half of the mould and the mould parts pre-heated to 90° C. and placed on the hot plate.

The plastics sheets are removed from the ribbon pairs and the ribbons carefully folded into 2.54 centimeter wide strips and cut to the desired length. The first ribbon is then layed longitudinally in the bottom of the cut-out in one of the mould halves and is rolled into contact with the cut-out surface and from the centre outwards in order to work out any entrapped air. During this stage of the process, care must be taken to keep the glass fibre filaments as straight as possible and to ensure that interaction between the resin and elastomer is minimised.

This process is repeated until each mould half is completely filled. The surfaces of the lay-up are then warmed and the mould halves brought together and clamped.

Curing of the component is a two stage process commencing with an eight hour cure at 55° C. during which time the resin is partially cured whilst the elastomer is in a fluid but non-workable state so that the elastomer does not tend to run into the resin matrix.

The temperature is then increased at the rate of 20° C. every 15 minutes up to a maximum temperature of 135° C. to finally cure the resin and to cure the elastomer. It will be apparent that, during this phase of operation, the elastomer is retained within the desired boundaries due to the cure state of the resin.

After cooling, the mould halves are separated and the connecting element removed from the mould.

In FIG. 4, an elongate connecting element 20 constructed in accordance with the invention is incorporated in a semi-rigid helicopter rotor 44 and extends radially from a rotor hub (not shown). The inner end region 22 of the element 20 is of flattened configuration in a plane of rotation so as to be capable of a resilient flexing in a blade flap plane during operation.

A titanium torque tube 28 is rotationally fixed to the outer end region 23 of element 24 through pins 29 and a split collet 30, and extends inwardly to encompass the intermediate region 26 and an outer end of inner end region 22. The tube 28 is rotationally mounted on anxially spaced-apart bearings 31 carried on a tubular sleeve 32 attached to radially extending webs 33 formed integrally with inner end region 22, and a pitch control lever 34 is attached to an inner end of the tube 28.

A radially extending outer flexure member 35 is formed integral with torque tube 28 and is of circular cross-section and formed with an apertured end 36 to facilitate attachment of a rotor blade.

In the preferred embodiment illustrated in FIG. 5, the torque tube 28 is constructed of carbon fibre reinforced plastics material and terminates at the rotationally fixed attachment to the outer region 23 of the elongate connecting element 20. In this arrangement, outer end region 23 of the element 20 is extended radially outwardly from the torque tube to terminate at an outer end 37 to which an apertured fitting 38 for attachment of a rotor blade is retained by a split collet 39 and a retaining ring 40.

The embodiment of FIG. 6 is similar to that previously described with reference to FIG. 5 except that the torque tube 28 comprises a split housing joined through bolt holes 41, and attachment fitting 38 is formed integrally with outer end 37 of outer end region 23 of element 20 by wrapping the filaments 24 around bushes 42.

FIG. 7 illustrates a further means of attachment of end fitting 39 alternative to the method shown in FIG. 5, and comprising a staggered bolted attachment 43.

In operation, the connecting element 20 of this invention exhibits low torsional stiffness due to the intermediate region 26 which permits relative twisting of end regions 22 and 23 about a longitudinal axis with resilient return, and high tensile strength due to the continuity of the tension carrying fibre filaments 24 throughout the length of element 20. These properties make element 20 particularly suited for use in supporting the sustaining rotor blades of a helicopter rotor, and the present invention extends to a helicopter having a main sustaining rotor incorporating such an element.

Operation of a helicopter rotor according to the invention will now be described in relation to the embodiments of FIGS. 4 to 6 inclusive.

Thus, in all embodiments, operational centrifugal loads caused by the rotating rotor blades are transmitted to a rotor hub (not shown) by connecting elements 20. Inner end region 22 of each element 20 is of flattened configuration in a plane parallel to the plane of rotation so as to be resiliently flexible in that plane to provide for blade flap movements. Blade pitch change inputs through lever 34 are transmitted through torque tube 28 to outer end region 23 of connecting element 20, which due to the incorporation of torsionally resilient intermediate region 26, twists about its longitudinal axis to change the pitch of a rotor blade attached to fitting 36, 38.

In the embodiment of FIG. 4, the titanium torque tube 28 is extended to include a flexure member 35 which is circular in cross section and therefore equally resilient in flap and lag planes. Thus, during operation, the majority of blade lead and lag deflections are accommodated in the flexure member 35, and undesirable pitch/flap coupling effects are prevented due to the equal resilience in the flap and lag planes.

In the preferred embodiment of FIG. 5, outer end region 23 of connecting member 20 is formed with a circular cross-sectional shape and is extending radially outwardly to outer end 37 to which blade attachment fitting 38 is attached. The random orientation of the fibre filaments 24 and the circular cross sectional shape ensures that this extension of outer end region 23 is equally resilient in any radial plane and therefore functions in a similar manner to the flexure member 35 of FIG. 4, but is however lighter and less expensive. Additionally, the torque tube 28 of FIG. 5 is constructed of fibre-reinforced plastics materials thereby further reducing weight and cost.

The embodiment of FIG. 6 incorporates an integral blade attachment fitting 38 and, in order to facilitate assembly, the torque tube of this embodiment comprises a two piece bolted assembly.

Thus, a helicopter rotor in accordance with the present invention dispenses with the mechanical tie-bar and the feathering bearings of the semi-rigid rotor of No. GB-A-1310035 thereby reducing weight, complexity and cost, as well as achieving a reduction in the frontal area. In this latter respect, it is to be noted that the axially spaced-apart bearings 31 supporting the torque tube 28, serve to transmit bending and shear loads caused by blade operational movements from the outer end region 23 to the inner end region 22, thereby isolating intermediate region 26 from such movements.

The present invention retains the desirable feature of the prior patent in that blade flap, lead/lag and feathering movements are accommodated in operationally separated regions of the rotor thereby ensuring that optimum requirements for a particular helicopter can be achieved virtually independently. However, in contrast with the earlier rotor, in the present invention at least two of these operational movements i.e. blade flap and feathering movements are accommodated in a single element, and in the preferred embodiments of FIGS. 5 and 6 all three operational movements are accomodated independently in operationally separated regions of a single connecting element, thereby minimising complexity, cost and weight.

Whilst several embodiments have been described and illustrated it will be understood that many modifications can be made without departing from the scope of the invention. For example, the connecting elements 20 can be formed integrally either with a fibre-reinforced plastics rotor hub or a fibre-reinforced rotor blade or both. Inner and outer end regions 22 and 23 can be of any suitable cross-sectional shape having desired operational properties, for instance, the extended outer end region 23 of the embodiments of FIGS. 5 and 6 could be of square cross-sectional shape whilst retaining the desired property of being equally resilient in both the flap and lead/lag planes.

It will be understood that the particular properties of a connecting element according to the invention can easily be varied to suit a particular application by the choice of alternative materials. Thus, the torsional stiffness of intermediate region 26 will depend upon the composition of the particular matrix material chosen. Thus, in the described embodiment, elastomer material has been used; however, other suitable materials such as rubber, a modified elastomer, or a combination of resilient materials or resilient and substantially rigid materials may also be used. For example, the filaments 24 extending through the intermediate region 26 may be treated with a resin prior to being embedded in the resilient matrix material 27. Similarly, the resilient properties of end regions 22 and 23 will vary depending on the fibres used, i.e. glass, carbon, boron etc., on the properties of the particular resin matrix and on the cross-sectional shape.

What is claimed is,

1. A helicopter rotor having a rotor hub and a plurality of radially extending rotor blades and including, for each blade, an elongate connecting element constructed of a plurality of individual fibre filaments extending longitudinally and substantially continuously throughout its length and including an inner and outer end regions wherein said filaments are embedded in a resin matrix material and an intermediate region wherein said filaments are embedded in a resilient elastomer matrix material, said inner end region extending from the rotor hub and adapted to be resiliently flexible in a blade flap plane, and blade pitch change means rotationally fixed to the outer end region and adapted during operation to twist the outer end region relative the inner end region to effect blade pitch changes.

2. A rotor as claimed in claim 1 wherein said pitch change means comprises a torque tube extending inwardly from its attachment to the outer end region of the connecting element to encompass the intermediate region and at least part of the inner end region.

3. A rotor as claimed in claim 2 wherein said torque tube is rotationally supported on the inner end region by axially spaced apart bearings.

4. A rotor as claimed in claim 1 wherein said outer end region extends radially outwardly to an outer end adapted for attachment of a rotor blade and is equally resiliently flexible in the flap and lag planes.

5. A helicopter rotor including a rotor hub and a plurality of radially extending rotor blade connecting elements each comprising an inner end region attached to the rotor hub, an intermediate region and an outer end region and is constructed of a plurality of individual fibre filaments extending substantially longitudinally and continuously throughout its length, that portion of the fibre filaments extending through the end regions being embedded in a thermo-setting resin matrix material and that portion of the length of the fibre filaments extending through the intermediate region being embedded in a resilient matrix material, said inner end region having a generally flattened configuration in a plane coincident with the plane of rotation of the rotor so as to be resiliently flexible in a blade flap plane, and an inwardly extending torque tube rotationally fixed to the outer end region and adapted for connection to a rotor control system, whereby blade feathering movements are permitted by resilient torsional motion of the intermediate region.

6. A rotor as claimed in claim 5 wherein the torque tube extends radially outwardly from its attachment to the outer end region of the connecting element to an outer end adapted for the attachment of a rotor blade, the extended portion being equally resiliently flexible in blade flap and lag planes.

7. A rotor as claimed in claim 5 wherein said outer end region extends radially outwardly from its attachment to the torque tube to an outer end adapted for the attachment of a rotor blade, the extended portion being equally resiliently flexible in blade flap and lag planes.

8. A rotor as claimed in claim 5 wherein the resilient matrix material is an elastomer material.

9. A rotor as claimed in claim 5 wherein the fibre filaments comprise unidirectional glass fibre filaments.

10. A rotor as claimed in claim 5 wherein the individual fibre filaments are substantially uniformly distributed in the resin matrix material in said end regions and in the resilient matrix material in said intermediate region.

11. A rotor as claimed in claim 5 wherein said outer end region is equally resiliently flexible in both perpendicularly opposed planes containing the longitudinal axis.

12. A rotor as claimed in claim 11 wherein said outer end region has at least a portion thereof that has a circular cross-sectional shape.

13. In a helicopter rotor including a rotor hub and a plurality of radially extending rotor blades, an elongate rotor blade connecting element for connecting each blade to the rotor rub, each connecting element comprising an inner end region that is resiliently flexible in one of two perpendicularly opposed planes containing the longitudinal axis of said connecting element, an intermediate region and an outer end region, wherein the element comprises a plurality of individual fibre filaments extending substantially longitudinally and substantially continuously throughout its length, that portion of the length of fibre filaments extending through said inner and outer end regions being embedded in a thermo-setting resin matrix material and that portion of the fibre filaments extending through the intermediate region being embedded in a resilient elastomer matrix material so as to permit relative resilient torsional movement of said inner and outer end regions about a longitudinal axis of said connecting element.

14. The connecting element as claimed in claim 13 wherein the fibre filaments comprise unidirectional glass fibre filaments.

15. The connecting element as claimed in claim 13 wherein said outer end region is equally resiliently flexible in both said opposed planes of said connecting element.

16. The connecting element as claimed in claim 15 wherein said inner end region has at least a portion thereof that has a flattened cross-sectional shape in a plane perpendicular to its plane of resilient flexibility and said outer end region has at least a portion thereof that has a circular cross-sectional shape.

* * * * *